US008648713B2

(12) United States Patent
Garavaglia et al.

(10) Patent No.: US 8,648,713 B2
(45) Date of Patent: Feb. 11, 2014

(54) APPARATUS AND METHOD FOR ENABLING AN AUTOMOTIVE MODULE DEVICE INDICATOR IN A WIRELESS COMMUNICATION SYSTEM

(75) Inventors: Andrea Garavaglia, Bavaria (DE); Matthias Schulist, Bavaria (DE); Oliver Michaelis, San Diego, CA (US); Georg Schweighofer, Munich (DE)

(73) Assignee: QUALCOMM Incorporated, San Diego, CA (US)

( * ) Notice: Subject to any disclaimer, the term of this patent is extended or adjusted under 35 U.S.C. 154(b) by 407 days.

(21) Appl. No.: 12/878,606

(22) Filed: Sep. 9, 2010

(65) Prior Publication Data

US 2012/0062376 A1 Mar. 15, 2012

(51) Int. Cl.
*G08B 1/08* (2006.01)
*H04L 12/58* (2006.01)
*G06F 7/00* (2006.01)

(52) U.S. Cl.
USPC ............... 340/539.11; 340/539.1; 340/505; 340/438; 340/10.1; 340/531; 455/412.1; 701/31.5

(58) Field of Classification Search
USPC ............................................ 340/539.11, 531
See application file for complete search history.

(56) References Cited

U.S. PATENT DOCUMENTS

| | | | |
|---|---|---|---|
| 6,225,898 B1 * | 5/2001 | Kamiya et al. | 340/505 |
| 6,330,499 B1 * | 12/2001 | Chou et al. | 701/31.4 |
| 6,640,115 B1 | 10/2003 | Fujimoto et al. | |
| 6,662,091 B2 * | 12/2003 | Wilson et al. | 701/29.3 |
| 2001/0012781 A1 | 8/2001 | Suzuki | |
| 2005/0059385 A1 | 3/2005 | Twigg et al. | |
| 2005/0119002 A1 | 6/2005 | Bauchot et al. | |
| 2010/0029270 A1 | 2/2010 | Kiddie et al. | |

FOREIGN PATENT DOCUMENTS

WO  2009141001 A1  11/2009
WO  2010007412 A1  1/2010

OTHER PUBLICATIONS

International Search Report and Written Opinion—PCT/US2011/050804—ISA/EPO—Nov. 21, 2011.

* cited by examiner

*Primary Examiner* — Donnie Crosland
(74) *Attorney, Agent, or Firm* — James T. Hagler (57) ABSTRACT

An apparatus and method for enabling an automotive module indicator in a wireless communication system comprising receiving a capability inquiry message from a wireless network; determining an information content for a capability message in response to the capability inquiry message; and transmitting the capability message to the wireless network. In one aspect, the apparatus and method comprising transmitting a capability inquiry message to a mobile device; and receiving a capability message from the mobile device in reply to the capability inquiry message, wherein the capability message includes an automotive indicator field to indicate presence or absence of an automotive module.

40 Claims, 8 Drawing Sheets

APPARATUS AND METHOD FOR ENABLING AN AUTOMOTIVE MODULE DEVICE INDICATOR IN A WIRELESS COMMUNICATION SYSTEM

FIELD

This disclosure relates generally to apparatus and methods for wireless communication. More particularly, the disclosure relates to introducing and enabling an automotive module indicator in a wireless communication system.

BACKGROUND

In many telecommunication systems, communications networks are used to exchange messages among several cooperating spatially-separated devices. The various types of communications networks may be classified in different aspects. In one example, the geographic scope of the network could be over a wide area, a metropolitan area, a local area, or a personal area, and the corresponding networks would be designated as wide area network (WAN), metropolitan area network (MAN), local area network (LAN), or personal area network (PAN). Networks also may be distinguished by the switching/routing technique used to interconnect the various network nodes and devices (e.g. circuit switching vs. packet switching), by the physical media employed for transmission (e.g. wired vs. wireless), or by the communication protocols used (e.g. Internet protocol suite, SONET (Synchronous Optical Networking), Ethernet, etc.).

One important communications network feature is the choice of wired or wireless transport media for the transmission of electromagnetic signals among the constituents of the network. For wired networks, tangible physical media such as copper wire, coaxial cable, fiber optic cable, etc. are employed to propagate guided electromagnetic waveforms which carry message traffic over a distance. Wired networks are a static form of communications networks and are typically favored for interconnection of fixed network elements or for bulk data transfer. For example, fiber optic cables are often the preferred transmission media for very high throughput transport applications over long distances between large network hubs, such as, bulk data transport across or between continents over the Earth's surface.

On the other hand, wireless networks are usually preferred when mobile network elements have dynamic connectivity needs or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks have the advantage of facilitating user mobility and rapid field deployment compared to fixed wired networks. However, usage of wireless propagation requires significant active resource management among the network users and high levels of mutual coordination and cooperation for compatible spectrum utilization.

In one example, wireless networks are compatible with various wireless protocols. Example versions of wireless protocols include Universal Mobile Telecommunications System (UMTS), High Speed Downlink Packet Access (HSDPA), High Speed Uplink Packet Access (HSUPA), Long Term Evolution (LTE), etc. Wireless systems compliant with these protocols are used for various communication services such as telephony, messaging, data transfer, emails, Internet access, audio broadcasts, video communications, etc. These wireless systems generally utilize an access node (AN), also known as base station (BS) or Node B, to connect to an individual access terminal (AT), also known as user equipment (UE) or user device, to fixed telecommunications infrastructure networks. In general, a radio coverage area is implemented using a plurality of Node Bs using a cellular-based topological architecture to provide wireless access, also known as an air interface, to the UEs (e.g., user devices). In one aspect, the Node Bs may be connected to a Radio Network Controller (RNC) to facilitate the interconnection to the fixed telecommunications infrastructure networks. In one aspect, the RNC is part a UMTS Terrestrial Radio Access Network (UTRAN).

SUMMARY

Disclosed is an apparatus and method for enabling an automotive module indicator in a wireless communication system. According to one aspect, a method for enabling an automotive module indicator in a wireless communication system comprising receiving a capability inquiry message from a wireless network; determining an information content for a capability message in response to the capability inquiry message; and transmitting the capability message to the wireless network.

According to another aspect, a method for enabling an automotive module indicator in a wireless communication system comprising transmitting a capability inquiry message to a mobile device; and receiving a capability message from the mobile device in reply to the capability inquiry message, wherein the capability message includes an automotive indicator field to indicate presence or absence of an automotive module.

According to another aspect, an apparatus for enabling an automotive module indicator in a wireless communication system comprising a receiver for receiving a capability inquiry message from a wireless network; a processor couple to the receiver for determining an information content for a capability message in response to the capability inquiry message; and a transmitter coupled to the processor for transmitting the capability message to the wireless network.

According to another aspect, an apparatus for enabling an automotive module indicator in a wireless communication system, the apparatus comprising a processor and a memory, the memory containing program code executable by the processor for performing the following: transmitting a capability inquiry message to a mobile device; and receiving a capability message from the mobile device in reply to the capability inquiry message, wherein the capability message includes an automotive indicator field to indicate presence or absence of an automotive module.

According to another aspect, an apparatus for enabling an automotive module indicator in a wireless communication system comprising means for receiving a capability inquiry message from a wireless network; means for determining an information content for a capability message in response to the capability inquiry message; and means for transmitting the capability message to the wireless network.

According to another aspect, an apparatus for enabling an automotive module indicator in a wireless communication system comprising means for transmitting a capability inquiry message to a mobile device; and means for receiving a capability message from the mobile device in reply to the capability inquiry message, wherein the capability message includes an automotive indicator field to indicate presence or absence of an automotive module.

According to another aspect, a computer-readable medium storing a computer program for enabling an automotive module indicator in a wireless communication system, wherein execution of the computer program is for: receiving a capability inquiry message from a wireless network; determining an information content for a capability message in response to the capability inquiry message; and transmitting the capability message to the wireless network.

According to another aspect, a computer-readable medium storing a computer program for enabling an automotive module indicator in a wireless communication system, wherein execution of the computer program is for: transmitting a capability inquiry message to a mobile device; and receiving a capability message from the mobile device in reply to the capability inquiry message, wherein the capability message includes an automotive indicator field to indicate presence or absence of an automotive module.

Advantages of the present disclosure may include the ability to enable a wireless network, for example a UMTS Terrestrial Radio Access Network (UTRAN), to select the appropriate QoS attributes and parameter settings for automotive modules. This selectability allows variable service quality within the wireless network. The wireless network operator may have a flexible and simple technique for tuning of QoS for such automotive modules without needing a more complex solution or involved optimization.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Figure 1:
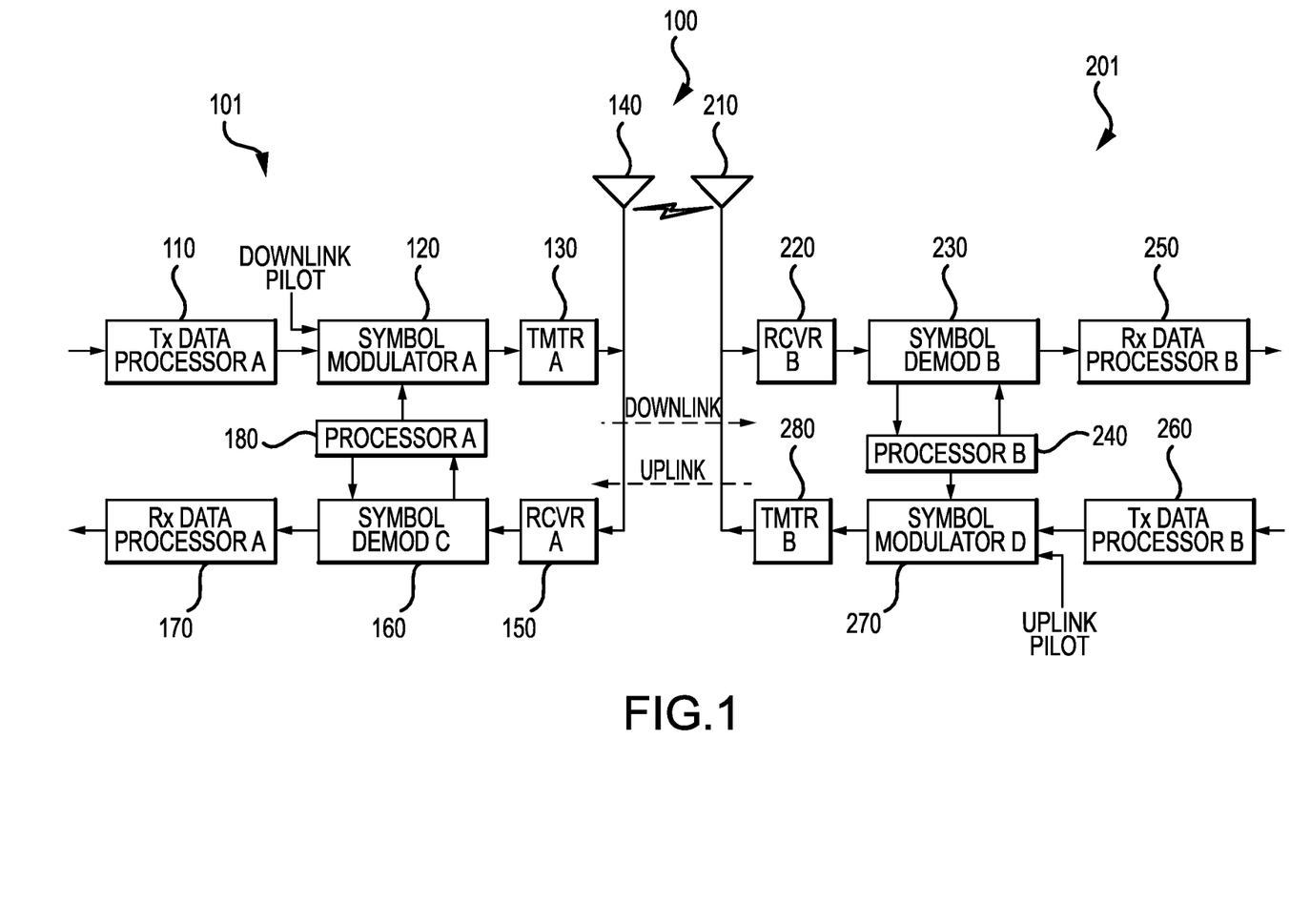
FIG. 1 is a block diagram illustrating an example access node/UE system.

FIG. 1 is a block diagram illustrating an example access node/UE system 100. One skilled in the art would understand that the example access node/UE system 100 illustrated in FIG. 1 may be implemented in an FDMA environment, an OFDMA environment, a CDMA environment, a WCDMA environment, a TDMA environment, a SDMA environment or any other suitable wireless environment.

The access node/UE system 100 includes an access node 101 (e.g., base station) and a user equipment or UE 201 (e.g., wireless communication device). In the downlink leg, the access node 101 (e.g., base station) includes a transmit (TX) data processor A 110 that accepts, formats, codes, interleaves and modulates (or symbol maps) traffic data and provides modulation symbols (e.g., data symbols). The TX data processor A 110 is in communication with a symbol modulator A 120. The symbol modulator A 120 accepts and processes the data symbols and downlink pilot symbols and provides a stream of symbols. In one aspect, it is the symbol modulator A 120 that modulates (or symbol maps) traffic data and provides modulation symbols (e.g., data symbols). In one aspect, symbol modulator A 120 is in communication with processor A 180 which provides configuration information. Symbol modulator A 120 is in communication with a transmitter unit (TMTR) A 130. The symbol modulator A 120 multiplexes the data symbols and downlink pilot symbols and provides them to the transmitter unit A 130.

Each symbol to be transmitted may be a data symbol, a downlink pilot symbol or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In yet another aspect, the downlink pilot symbols are code division multiplexed (CDM). In one aspect, the transmitter unit A 130 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 140.

In the downlink leg, the UE 201 includes antenna 210 for receiving the analog downlink signal and inputting the analog downlink signal to a receiver unit (RCVR) B 220. In one aspect, the receiver unit B 220 conditions, for example, filters, amplifies, and frequency downconverts the analog downlink signal to a first "conditioned" signal. The first "conditioned" signal is then sampled. The receiver unit B 220 is in communication with a symbol demodulator B 230. The symbol demodulator B 230 demodulates the first "conditioned" and "sampled" signal (e.g., data symbols) outputted from the receiver unit B 220. One skilled in the art would understand that an alternative is to implement the sampling process in the symbol demodulator B 230. The symbol demodulator B 230 is in communication with a processor B 240. Processor B 240 receives downlink pilot symbols from symbol demodulator B 230 and performs channel estimation on the downlink pilot symbols. In one aspect, the channel estimation is the process of characterizing the current propagation environment. The symbol demodulator B 230 receives a frequency response estimate for the downlink leg from processor B 240. The symbol demodulator B 230 performs data demodulation on the data symbols to obtain data symbol estimates on the downlink path. The data symbol estimates on the downlink path are estimates of the data symbols that were transmitted. The symbol demodulator B 230 is also in communication with a RX data processor B 250.

The RX data processor B 250 receives the data symbol estimates on the downlink path from the symbol demodulator B 230 and, for example, demodulates (i.e., symbol demaps), deinterleaves and/or decodes the data symbol estimates on the downlink path to recover the traffic data. In one aspect, the processing by the symbol demodulator B 230 and the RX data processor B 250 is complementary to the processing by the symbol modulator A 120 and TX data processor A 110, respectively.

In the uplink leg, the UE 201 includes a TX data processor B 260. The TX data processor B 260 accepts and processes traffic data to output data symbols. The TX data processor B 260 is in communication with a symbol modulator D 270. The symbol modulator D 270 accepts and multiplexes the data symbols with uplink pilot symbols, performs modulation and provides a stream of symbols. In one aspect, symbol modulator D 270 is in communication with processor B 240 which provides configuration information. The symbol modulator D 270 is in communication with a transmitter unit B 280.

Each symbol to be transmitted may be a data symbol, an uplink pilot symbol or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In yet another aspect, the uplink pilot symbols are code division multiplexed (CDM). In one aspect, the transmitter unit B 280 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 210.

The analog uplink signal from UE 201 is received by antenna 140 and processed by a receiver unit A 150 to obtain samples. In one aspect, the receiver unit A 150 conditions, for example, filters, amplifies and frequency downconverts the analog uplink signal to a second "conditioned" signal. The second "conditioned" signal is then sampled. The receiver unit A 150 is in communication with a symbol demodulator C 160. One skilled in the art would understand that an alternative is to implement the sampling process in the symbol demodulator C 160. The symbol demodulator C 160 performs data demodulation on the data symbols to obtain data symbol estimates on the uplink path and then provides the uplink pilot symbols and the data symbol estimates on the uplink path to the RX data processor A 170. The data symbol estimates on the uplink path are estimates of the data symbols that were transmitted. The RX data processor A 170 processes the data symbol estimates on the uplink path to recover the traffic data transmitted by the wireless communication device 201. The symbol demodulator C 160 is also in communication with processor A 180. Processor A 180 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 180 and processor B 240 direct (i.e., control, coordinate or manage, etc.) operation at the access node 101 (e.g., base station) and at the UE 201, respectively. In one aspect, either or both processor A 180 and processor B 240 are associated with one or more memory units (not shown) for storing of program codes and/or data. In one aspect, either or both processor A 180 or processor B 240 or both perform computations to derive frequency and impulse response estimates for the uplink leg and downlink leg, respectively.

In one aspect, the access node/UE system 100 is a multiple-access system. For a multiple-access system (e.g., frequency division multiple access (FDMA), orthogonal frequency division multiple access (OFDMA), code division multiple access (CDMA), time division multiple access (TDMA), space division multiple access (SDMA), etc.), multiple terminals transmit concurrently on the uplink leg, allowing access to a plurality of UEs. In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

Figure 2:
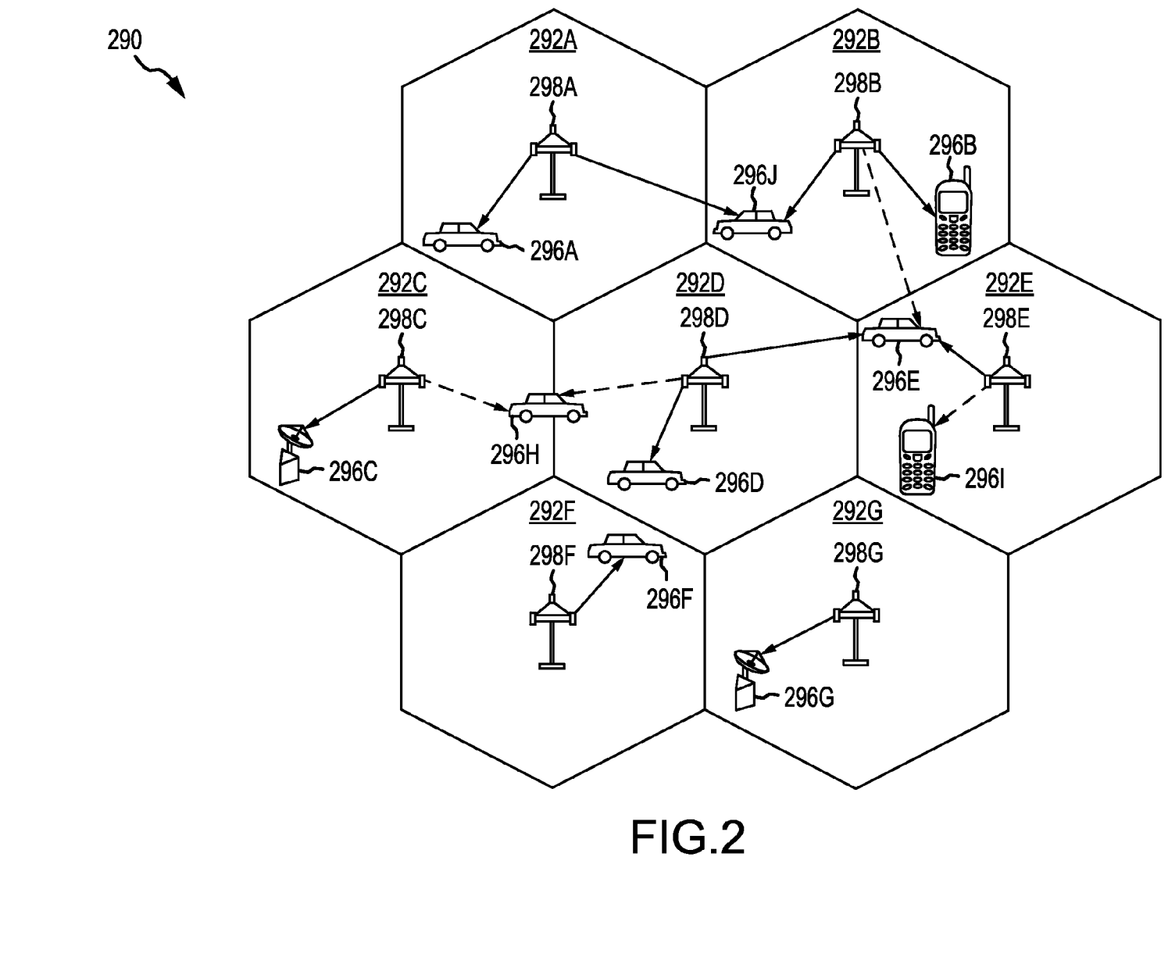
FIG. 2 illustrates an example of a wireless communications system 290 that supports a plurality of users.

FIG. 2 illustrates an example of a wireless communications system 290 that supports a plurality of users (e.g., mobile user devices 296B, 296I). In FIG. 2, reference numerals 292A to 292G refer to cells, reference numerals 298A to 298G refer to base stations (BS) or base transceiver station (BTS) and reference numerals 296A to 296J refer to access User Equipments (UE) or mobile user devices. Cell size and shape may vary. Any of a variety of algorithms and methods may be used to schedule transmissions in system 290. System 290 provides communication for a number of cells 292A through 292G, each of which is serviced by a corresponding base station 298A through 298G, respectively.

In one example, automotive modules are wireless devices which are embedded inside automobiles and commercial vehicles to provide voice and data connectivity to the driver and the car. Unlike other wireless devices, automotive modules are not intended to be removed from the car and are usually sold to the final user by car manufacturers at a premium price. In one aspect, such automotive modules require a different quality of service than normal mobile handsets since they are an integral part of the car, often at a top market segment. Moreover, automotive modules inherently follow a typical automobile mobility pattern. As such, the wireless network may need to handle QoS parameters and other parameter settings for automotive modules in a different manner than for other wireless devices.

In one example, wireless system users desire differentiated services to mobile devices, for example, by providing a higher quality of service (QoS). One solution may be based on providing an indicator in existing wireless standards to assist the wireless network in identifying an automotive module in a simple and rapid manner. In one example, the wireless standard may be based on the 3GPP standards and the wireless network is known as UMTS Terrestrial Radio Access Network (UTRAN). This solution enables optimized parameter settings. One skilled in the art would understand that the 3GPP standards and the UTRAN are disclosed as examples and do not limit the spirit or scope of the present disclosure from being applicable to other standards and networks.

An indicator approach has been used in the 3GPP standards for Device Type, for example, in UMTS Rel. 6, a Device Type indicator was defined to indicate whether or not a mobile device can benefit from battery enhancements. However, no distinction has been offered for automotive module applications.

In one example, existing wireless standards, for example in 3GPP systems, may be enhanced by an additional Device Type attribute which indicates whether a mobile device is an automotive module or not. In one aspect, the automotive module indicator may be part of the UE capability information elements (IE) which are conveyed to the UTRAN during a radio resource control (RRC) connection setup or a capability exchange. In one example, the automotive module indicator default value may be defined as "NotAutomotiveModule" to be used by all mobile devices which are not embedded in a vehicle. In another aspect, the absence of the automotive indicator would mean that the module should be treated as non-automotive module. In another example, the automotive module indicator value may be defined as "AutomotiveModule" for any mobile device which is embedded in a vehicle. In one aspect, the introduction of the automotive module indicator default value may be made in a backward compatible mode such that legacy wireless systems would remain compatible with the additional indicator capability.

In one example, QoS attributes may be tuned according to the device type using the proposed automotive module indicator value. For example, in the case of inter-system handoffs, e.g., from a 3G system to a 2G system, a shorter handoff window could be configured based on the knowledge that an automotive module is present which typically has a much higher speed than other mobile devices.

In addition, provision of an automotive module indicator may enable wireless carriers to identify QoS issues which are specific to automotive use cases. Such knowledge may provide information for network planning and configuration.

Figure 3:
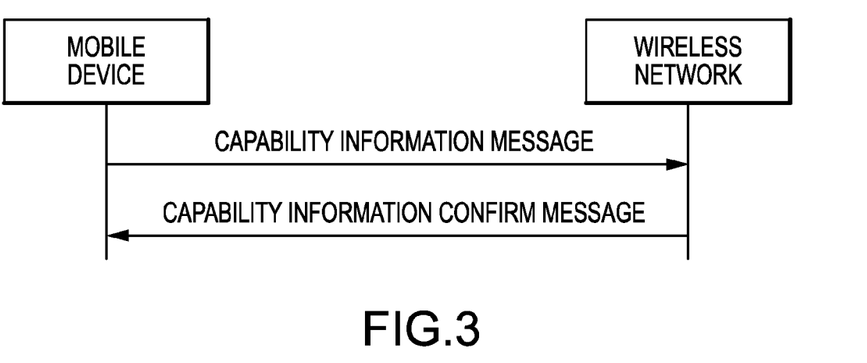
FIG. 3 illustrates an example sequence diagram for communicating an automotive module indicator state from a mobile device to a wireless network.

FIG. 3 illustrates an example sequence diagram for communicating an automotive module indicator state from a mobile device to a wireless network. In one example, the mobile device is an automotive module and the wireless network is a UTRAN. FIG. 3 shows that a mobile device, for example an automotive module, sends a Capability Information message to a wireless network, for example a UTRAN. Next, the wireless network, or UTRAN, sends either an explicit or implicit Capability Information Confirm message back to the mobile device, or automotive module, to acknowledge receipt of the first message. In one aspect, the Capability Information message includes an automotive module indicator field to indicate the presence or absence of an automotive module. In another aspect, the Capacity Information message could be implied by another parameter setting.

Figure 4:
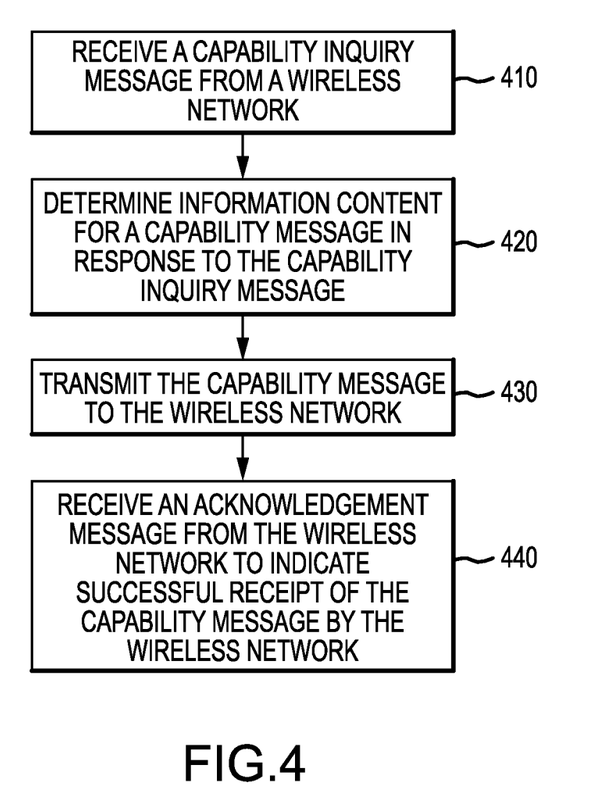
FIG. 4 illustrates an example flow diagram for enabling an automotive module indicator in a wireless communication system from the perspective of a mobile device.

FIG. 4 illustrates an example flow diagram for enabling an automotive module indicator in a wireless communication system from the perspective of a mobile device. In one example, the mobile device is an automotive module. In block 410, receive a capability inquiry message from a wireless network. In one example, the wireless network is a UTRAN. In block 420, determine information content for a capability message in response to the capability inquiry message. In one aspect, the information content comprises an indicator field. In one example, the indicator field is an automotive indicator field to indicate the presence or absence of an automotive module. In one aspect, the presence of the automotive module allows differentiated quality of service (QoS) to be provided by the wireless network to the automotive module. In block 430, transmit the capability message to the wireless network. In one example, a physical layer waveform with encoding and modulation is used for transmitting the capability message. In one example, the wireless network is one of the following: UTRAN, cdma 2000, LTE, UMTS/Global System for Mobile Communications (UMTS/GSM) or GSM EDGE Radio Access Network (GERAN). One skilled in the art would understand that other wireless networks, for example, within the 3GPP or 3GGP2 families, may be equally applicable without affecting the scope or spirit of the present disclosure. In block 440, receive an acknowledgement message from the wireless network to indicate successful receipt of the capability message by the wireless network. In one example, the steps of blocks 410 through 440 are performed by at least one antenna, a processor and a memory. In one example, the steps of blocks 410 through 440 are performed by a transceiver (e.g., a receiver and a transmitter), a processor and a memory.

Figure 5:
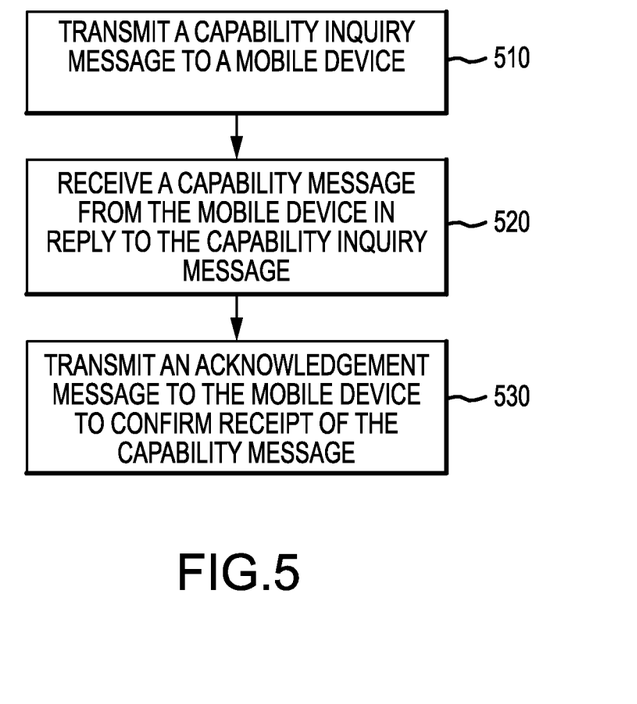
FIG. 5 illustrates an example flow diagram for enabling an automotive module indicator in a wireless communication system from the perspective of a wireless network.

FIG. 5 illustrates an example flow diagram for enabling an automotive module indicator in a wireless communication system from the perspective of a wireless network. In one example, the wireless network is a UTRAN. In block 510, transmit a capability inquiry message to a mobile device. In block 520, receive a capability message from the mobile device in reply to the capability inquiry message. In one example, the capability message includes an indicator field. In one example, the indicator field is an automotive indicator field to indicate the presence or absence of an automotive module. In one aspect, the presence of the automotive module allows differentiated quality of service (QoS) to be provided by the wireless network to the automotive module. In block 530, transmit an acknowledgement message to the mobile device to confirm receipt of the capability message. In one example, the steps of blocks 510 through 530 are performed by at least one antenna, a processor and a memory. In one example, the steps of blocks 510 through 530 are performed by a transceiver (e.g., a receiver and a transmitter), a processor and a memory.

One skilled in the art would understand that the steps disclosed in the example flow diagrams in FIGS. 4 and 5 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, and/or hardware configured with software instructions to perform the described algorithm steps. Various illustrative components, blocks, modules, circuits, and/or algorithm steps have been described above generally in terms of their functionality. Whether such functionality is implemented as hardware and/or hardware configured with software instructions depends upon the particular application and design constraints imposed on the overall system Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more exemplary aspects, the functions described may be implemented in hardware, software, firmware, or any combination thereof. If implemented in software, the functions may be stored as one or more instructions or code on a non-transitory computer-readable medium. The steps of a method or algorithm disclosed herein may be embodied in a processor-executable software module which may reside on a non-transitory computer-readable medium. Computer-readable media includes computer storage media including any non-transitory medium that facilitates transfer of a computer program from one place to another. A non-transitory storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers, Combinations of the above should also be included within the scope of non-transitory computer-readable media.

Figure 6:
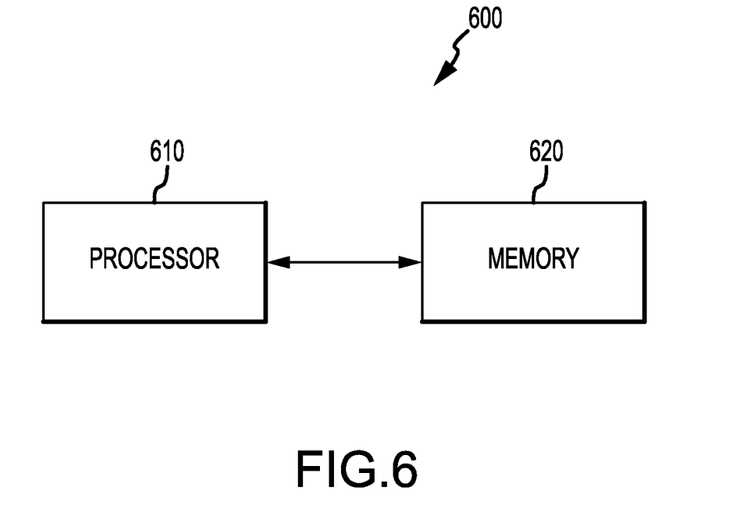
FIG. 6 illustrates an example of a device comprising a processor in communication with a memory for executing the processes for enabling an automotive module indicator in a wireless communication system.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 6 illustrates an example of a device 600 comprising a processor 610 in communication with a memory 620 for executing the processes for enabling an automotive module indicator in a wireless communication system. In one example, the device 600 is used to implement the algorithms illustrated in FIGS. 4 and 5. In one aspect, the memory 620 is located within the processor 610. In another aspect, the memory 620 is external to the processor 610. In one aspect, the processor includes circuitry for implementing or performing the various flow diagrams, logical blocks and/or modules described herein.

Figure 7:
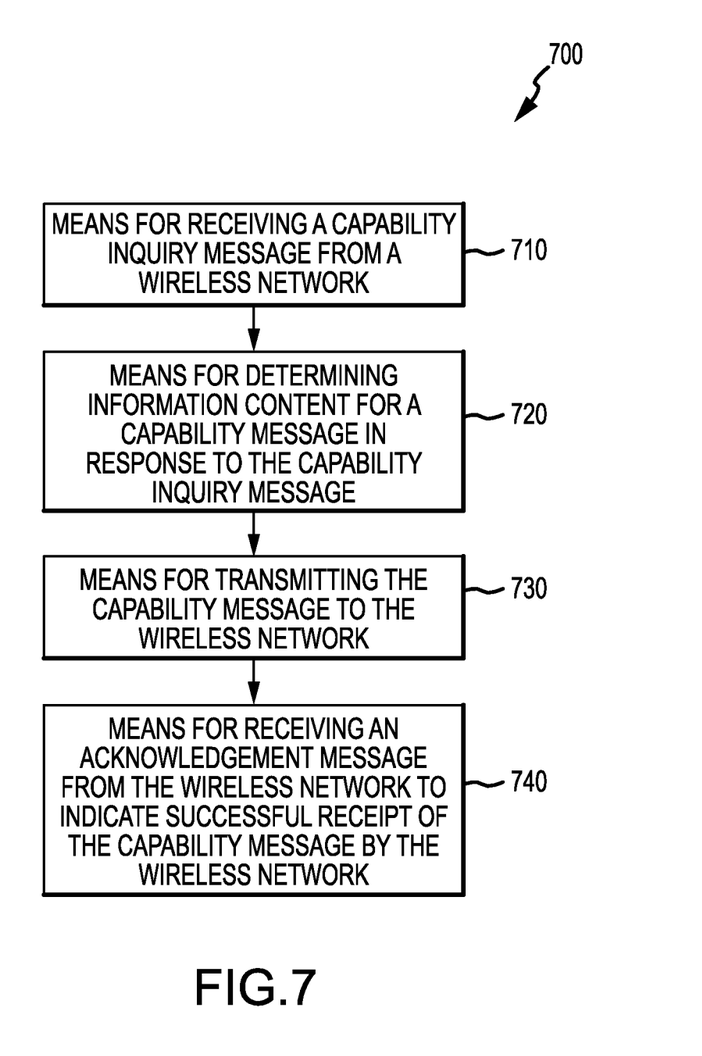
FIG. 7 illustrates an example of a device suitable for enabling an automotive module indicator in a wireless communication system from the perspective of a mobile device.

FIG. 7 illustrates an example of a device 700 suitable for enabling an automotive module indicator in a wireless communication system from the perspective of a mobile device. In one aspect, the device 700 is implemented by at least one processor comprising one or more modules configured to provide different aspects of enabling an automotive module indicator in a wireless communication system from the perspective of a mobile device as described herein in blocks 710, 720, 730 and 740. For example, each module comprises hardware, firmware, software, or any combination thereof. In one aspect, the device 700 is also implemented by at least one memory in communication with the at least one processor.

Figure 8:
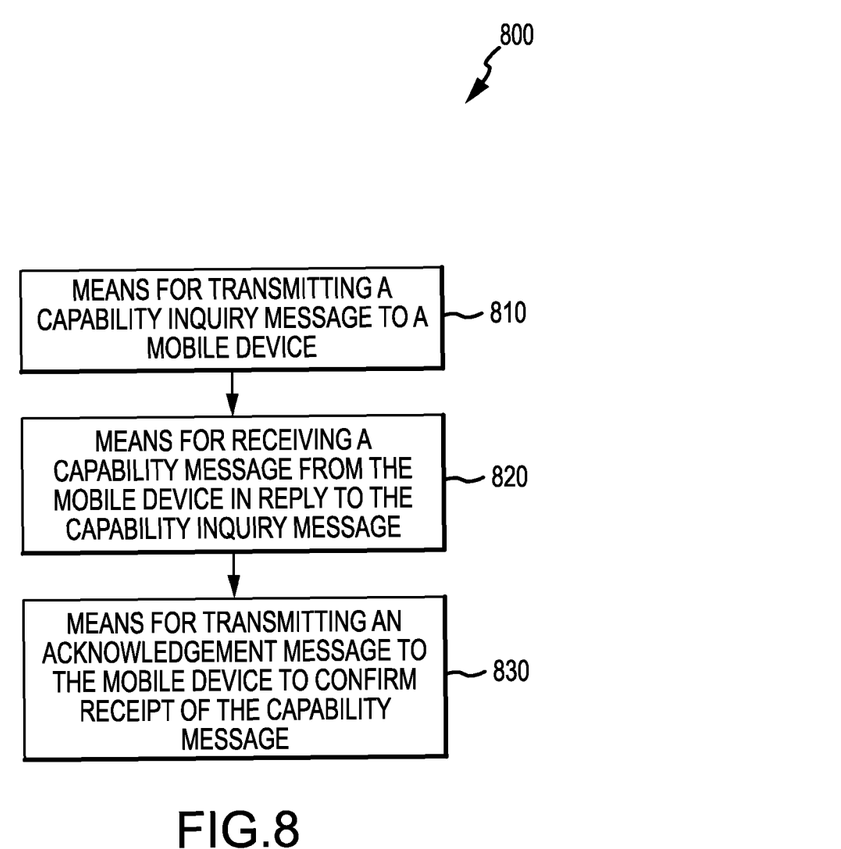
FIG. 8 illustrates an example of a device suitable for enabling an automotive module indicator in a wireless communication system from the perspective of a wireless network.

FIG. 8 illustrates an example of a device 800 suitable for enabling an automotive module indicator in a wireless communication system from the perspective of a wireless network. In one aspect, the device 800 is implemented by at least one processor comprising one or more modules configured to provide different aspects of enabling an automotive module indicator in a wireless communication system from the perspective of a wireless network as described herein in blocks 810, 820 and 830. For example, each module comprises hardware, firmware, software, or any combination thereof. In one aspect, the device 800 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for enabling an automotive module indicator in a wireless communication system comprising:
   receiving a capability inquiry message from a wireless network;
   determining an information content for a capability message in response to the capability inquiry message; and
   transmitting the capability message to the wireless network.

2. The method of claim 1 further comprising receiving an acknowledgement message from the wireless network to indicate successful receipt of the capability message.

3. The method of claim 1 wherein the information content comprises an automotive indicator field to indicate presence or absence of an automotive module.

4. The method of claim 3 wherein the presence of the automotive module allows a differentiated quality of service (QoS) to be provided to the automotive module.

5. The method of claim 4 wherein the wireless network is one of the following:
UMTS Terrestrial Radio Access Network (UTRAN), cdma 2000, LTE, UMTS/Global System for Mobile Communications (UMTS/GSM) or GSM EDGE Radio Access Network (GERAN).

6. The method of claim 3 wherein a physical layer waveform with encoding and modulation is used for transmitting the capability message.

7. The method of claim 6 wherein the capability message is transmitted during a radio resource control (RRC) connection setup or a capability exchange.

8. The method of claim 3 wherein the automotive indicator field has a default value of NotAutomotiveModule when the automotive module is not embedded in a vehicle or AutomotiveModule when the automotive module is embedded in the vehicle.

9. A method for enabling an automotive module indicator in a wireless communication system comprising:
transmitting a capability inquiry message to a mobile device; and
receiving a capability message from the mobile device in reply to the capability inquiry message, wherein the capability message includes an automotive indicator field to indicate presence or absence of an automotive module.

10. The method of claim 9 further comprising transmitting an acknowledgement message to confirm receipt of the capability message.

11. An apparatus for enabling an automotive module indicator in a wireless communication system comprising:
a receiver for receiving a capability inquiry message from a wireless network;
a processor couple to the receiver for determining an information content for a capability message in response to the capability inquiry message; and
a transmitter coupled to the processor for transmitting the capability message to the wireless network.

12. The apparatus of claim 11 wherein the receiver is further configured for receiving an acknowledgement message from the wireless network to indicate successful receipt of the capability message.

13. The apparatus of claim 11 wherein the information content comprises an automotive indicator field to indicate presence or absence of an automotive module.

14. The apparatus of claim 13 wherein the presence of the automotive module allows a differentiated quality of service (QoS) to be provided to the automotive module.

15. The apparatus of claim 14 wherein the wireless network is one of the following:
UMTS Terrestrial Radio Access Network (UTRAN), cdma 2000, LTE, UMTS/Global System for Mobile Communications (UMTS/GSM) or GSM EDGE Radio Access Network (GERAN).

16. The apparatus of claim 13 wherein a physical layer waveform with encoding and modulation is used for transmitting the capability message.

17. The apparatus of claim 16 wherein the capability message is transmitted during a radio resource control (RRC) connection setup or a capability exchange.

18. The apparatus of claim 13 wherein the automotive indicator field has a default value of NotAutomotiveModule when the automotive module is not embedded in a vehicle or AutomotiveModule when the automotive module is embedded in the vehicle.

19. An apparatus for enabling an automotive module indicator in a wireless communication system, the apparatus comprising:
a processor; and
a memory, the memory having stored thereon software instructions configured to cause the processor to perform operations comprising:
transmitting a capability inquiry message to a mobile device; and
receiving a capability message from the mobile device in reply to the capability inquiry message, wherein the capability message includes an automotive indicator field to indicate presence or absence of an automotive module.

20. The apparatus of claim 19, wherein the software instructions stored on the memory are configured to cause the processor to perform operations further comprising transmitting an acknowledgement message to confirm receipt of the capability message.

21. An apparatus for enabling an automotive module indicator in a wireless communication system comprising:
means for receiving a capability inquiry message from a wireless network;
means for determining an information content for a capability message in response to the capability inquiry message; and
means for transmitting the capability message to the wireless network.

22. The apparatus of claim 21 further comprising means for receiving an acknowledgement message from the wireless network to indicate successful receipt of the capability message.

23. The apparatus of claim 21 wherein the information content comprises an automotive indicator field to indicate presence or absence of an automotive module.

24. The apparatus of claim 23 wherein the presence of the automotive module allows a differentiated quality of service (QoS) to be provided to the automotive module.

25. The apparatus of claim 24 wherein the wireless network is one of the following:
UMTS Terrestrial Radio Access Network (UTRAN), cdma 2000, LTE, UMTS/Global System for Mobile Communications (UMTS/GSM) or GSM EDGE Radio Access Network (GERAN).

26. The apparatus of claim 23 wherein a physical layer waveform with encoding and modulation is used for transmitting the capability message.

27. The apparatus of claim 26 wherein the capability message is transmitted during a radio resource control (RRC) connection setup or a capability exchange.

28. The apparatus of claim 23 wherein the automotive indicator field has a default value of NotAutomotiveModule when the automotive module is not embedded in a vehicle or AutomotiveModule when the automotive module is embedded in the vehicle.

29. An apparatus for enabling an automotive module indicator in a wireless communication system comprising:
means for transmitting a capability inquiry message to a mobile device; and
means for receiving a capability message from the mobile device in reply to the capability inquiry message, wherein the capability message includes an automotive indicator field to indicate presence or absence of an automotive module.

30. The apparatus of claim 29 further comprising means for transmitting an acknowledgement message to confirm receipt of the capability message.

31. A non-transitory processor-readable storage medium having stored thereon processor-executable instructions configured to cause a processor to perform operations comprising:
   receiving a capability inquiry message from a wireless network;
   determining an information content for a capability message in response to the capability inquiry message; and
   transmitting the capability message to the wireless network.

32. The non-transitory processor-readable storage medium of claim 31, wherein the stored processor-executable instructions are configured to cause a processor to perform operations further comprising:
   receiving an acknowledgement message from the wireless network to indicate successful receipt of the capability message.

33. The non-transitory processor-readable storage medium of claim 31, wherein the stored processor-executable instructions are configured to perform operations such that the information content comprises an automotive indicator field to indicate presence or absence of an automotive module.

34. The non-transitory processor-readable storage medium of claim 33, wherein the stored processor-executable instructions are configured to perform operations such that the presence of the automotive module allows a differentiated quality of service (QoS) to be provided to the automotive module.

35. The non-transitory processor-readable storage medium of claim 34, wherein the wireless network is one of the following: UMTS Terrestrial Radio Access Network (UTRAN), cdma 2000, LTE, UMTS/Global System for Mobile Communications (UMTS/GSM) or GSM EDGE Radio Access Network (GERAN).

36. The non-transitory processor-readable storage medium of claim 33, wherein the stored processor-executable instructions are configured to cause a processor to perform operations such that a physical layer waveform with encoding and modulation is used for transmitting the capability message.

37. The non-transitory processor-readable storage medium of claim 36 wherein the stored processor-executable instructions are configured such that the capability message is transmitted during a radio resource control (RRC) connection setup or a capability exchange.

38. The non-transitory processor-readable storage medium of claim 33 wherein the stored processor-executable instructions are configured to perform operations such that the automotive indicator field has a default value of NotAutomotiveModule when the automotive module is not embedded in a vehicle or AutomotiveModule when the automotive module is embedded in the vehicle.

39. A non-transitory processor-readable storage medium having stored thereon processor-executable instructions configured to cause a processor to perform operations comprising:
   transmitting a capability inquiry message to a mobile device; and
   receiving a capability message from the mobile device in reply to the capability inquiry message, wherein the capability message includes an automotive indicator field to indicate presence or absence of an automotive module.

40. The non-transitory processor-readable storage medium of claim 39 wherein for the stored processor-executable instructions are configured to cause a processor to perform operations further comprising:
   transmitting an acknowledgement message to confirm receipt of the capability message.

* * * * *